United States Patent
Joudon et al.

(10) Patent No.: US 10,794,818 B2
(45) Date of Patent: *Oct. 6, 2020

(54) SYSTEM FOR LARGE CYLINDER DRUM PEEL TESTING

(71) Applicant: SAFRAN AIRCRAFT ENGINES, Paris (FR)

(72) Inventors: Vincent Joudon, Brie-Comte-Robert (FR); Pierre Antoine Bossan, Newmarket, NH (US); Matthew Savage, North Berwick, ME (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 200 days.

This patent is subject to a terminal disclaimer.

(21) Appl. No.: 16/114,479

(22) Filed: Aug. 28, 2018

(65) Prior Publication Data

US 2019/0064054 A1 Feb. 28, 2019

Related U.S. Application Data

(60) Provisional application No. 62/550,705, filed on Aug. 28, 2017.

(51) Int. Cl.
*G01N 19/04* (2006.01)

(52) U.S. Cl.
CPC ..... *G01N 19/04* (2013.01); *G01N 2203/0025* (2013.01); *G01N 2203/0091* (2013.01); *G01N 2203/0605* (2013.01)

(58) Field of Classification Search
CPC ........... G01N 19/04; G01N 2203/0003; G01N 2203/0091; G01N 2203/0605; G01N 2203/0025; G01N 2203/0262; G01N 2203/027; G01N 2203/0298; G01N 3/14; G01M 5/0016; G01M 5/0075; G01M 5/005

See application file for complete search history.

(56) References Cited

U.S. PATENT DOCUMENTS 10,126,228 B2 * 11/2018 Brossier ................... G01N 3/14
10,302,550 B2 * 5/2019 Brossier .............. G01M 5/0016

* cited by examiner

*Primary Examiner* — Suman K Nath
(74) *Attorney, Agent, or Firm* — Oblon, McClelland, Maier & Neustadt, L.L.P.

(57) ABSTRACT

A peel testing device designed to test the resistance to peeling of test pieces each formed from a support and from a reinforcement glued to this support, and comprising a frame with a face roller and at least one guide roller, a traction machine configured to peel the reinforcement from the surface of the support in a peeling direction tangential to the face roller and a sensor for measuring the force exerted by the traction machine during peeling, the device also comprising a fastening cable connected, on the one hand, to the traction machine and on the other hand to the face roller with which it forms a pulley system and the face roller which has a greater diameter than that of the guide roller comprises a mounting element for holding the reinforcement fixedly there.

8 Claims, 3 Drawing Sheets

SYSTEM FOR LARGE CYLINDER DRUM PEEL TESTING

BACKGROUND OF THE INVENTION

The invention relates to a peel testing device allowing testing of the mechanical strength of a glued interface, particularly adapted to tests of test pieces originating in fan blades each formed from a support and from a reinforcement glued on this support, as well as the corresponding implementation method.

Described at present, with reference to FIG. 1, is a peel testing device already known from patent application FR3028313 filed in the name of the applicant and comprising: a frame 12 with a face roller 14 and at least one guide roller 16, with parallel axes designed to hold the test piece 18 in abutment while still guiding it in displacement, tangentially to the rollers, by rolling, during the peel test, at least one of these two rollers being adjustable in translation within a slot 20, 22; fastening means 24 designed to fasten to the reinforcement; traction means 26 connected to the fastening means, configured to draw the attachment means in a traction direction tangential to the front roller 14, and designed to peel the reinforcement from the surface of the support; and measurement means 28 of the force exerted by the traction means to draw the fastening means during peeling.

When the reinforcement is of small and constant thickness (typically less than 0.5 mm), this device is satisfactory overall in providing a simple, effective and economical solution allowing peel tests to be carried out on test pieces with relatively complex shapes and in estimating the resistance to failure of the glued interface by using the mean force measured during the test.

However, a portion of the force measured during the test originates solely from the deformation of the reinforcement and is not representative of the resistance to failure of the glued interface. In fact, if the reinforcement has a small thickness, then its low stiffness will allow it to conform with little force to the shape of the cylindrical backing which controls its deformation during the test as a whole. This is however not the case with a fan blade reinforcement of with a variable thickness which can exceed 1.0 mm. The high stiffness of this reinforcement strongly increases the force necessary for bending it and does not allow it to conform to the shape of the cylindrical backing which normally controls its deformation. Consequently, the force necessary for deforming the fan blade reinforcement represents the major portion of the measured force and varies considerably during a given test and also during two different tests, which makes it difficult to use in this particular case.

OBJECT AND SUMMARY OF THE INVENTION

The present invention therefore has as its goal to mitigate such disadvantages by proposing a peel testing device in which the force necessary for the deformation of the reinforcement over the entire test is reproducible, repeatable and remains less than or equal to the force participating in the failure of the glued interface.

To this end, a peel testing device is provided designed to test the resistance to peeling of test pieces each formed from a support and a reinforcement glued to this support, and comprising: a frame with a face roller and at least one guide roller, with parallel axes designed to hold the test piece in abutment while still guiding it in displacement, tangentially to the rollers, by rolling, during the peel testing, at least one of these two rollers being movable and adjustable in translation in at least one slot; a traction machine configured to peel the reinforcement from the support in a peeling direction tangential to the face roller; and a sensor for measuring the force exerted by the traction machine during peeling, characterized in that it also comprises a fastening cable connected, on the one hand, to the traction machine, and on the other to the face roller with which it forms a pulley system and in that the face roller, which has a greater diameter than that of the guide roller, comprises a mounting element to retain the reinforcement fixedly there.

Thus, by reducing considerably the influence of the deformation of the reinforcement on the measurement, the invention allows effective use of the peeling force to characterize the resistance to failure of the glued interface.

Preferably, the fastening cable is folded in two to form a loop designed to be connected to the traction machine and two parallel strands of the same length, of which the two free ends are designed to be mounted on the face roller.

Advantageously, the face roller comprises at its periphery and on either side of the mounting element two circular recesses for receiving the two parallel strands of the fastening cable.

Preferably, the roller is adjustable in translation by means of two adjusting wheels acting on a shaft carrying the roller.

Advantageously, the mounting element is a wedge retaining by a threaded clamp a free end of the reinforcement in a compartment of the face roller.

Preferably, the guide roller has the shape of a spool with a hollow core and two flanges at its two ends designed to form two supporting surfaces for the test piece.

Advantageously, the radius of the face roller is determined so that the force necessary for the deformation of the reinforcement remains less than or equal to half the force measured by the sensor.

Preferably, the support is a portion of a blade airfoil made of composite and the reinforcement is a metal blade reinforcement, typically made of titanium.

BRIEF DESCRIPTION OF THE DRAWINGS

Other features and advantages of the present invention will be revealed from the detailed description made below, with reference to the following figures, free of any limiting character and in which.

DETAILED DESCRIPTION OF THE INVENTION

Figure 1:
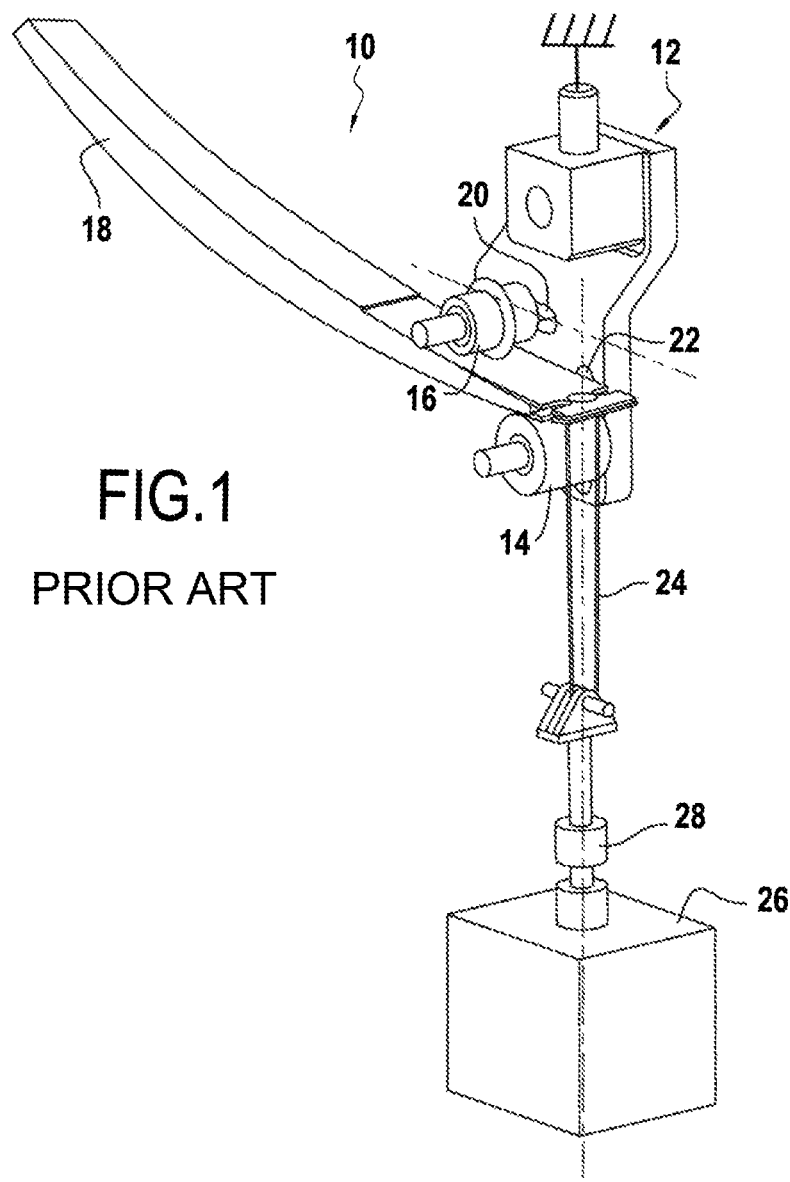
FIG. 1, already described, is a schematic view of a peel testing device according to the prior art.
Figure 2:
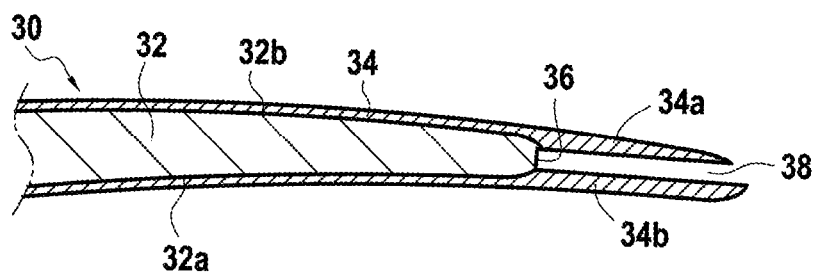
FIG. 2 is a profile view of a test piece for peel testing originating in a blade, according to the invention.

In FIG. 2 a test piece 30 is shown originating in a fan blade which has been cut along planes perpendicular to its leading edge. Such a blade comprises an airfoil 32, made of organic matrix composite (CMO), which constitutes the support of the test piece. It also comprises a metal reinforcement 34, advantageously made of titanium, which is glued to the upstream portion of the blade, and which constitutes the reinforcement of the test piece. Hereafter, the test piece will be referred to while continuing to use the notion of airfoil to designate the support and the notion of metal reinforcement to designate the reinforcement. As can be seen, the airfoil has a pressure surface 32a, a suction surface 32b which are joined at a leading edge 36. The pressure and suction surfaces of the test pieces with the metal reinforcement 34 glued to them are curved differently from each other, and the thickness of the airfoil 32 varies between these surfaces. Within the scope of its implementation in the peel testing device of the invention, the metal reinforcement 34 formed customarily in a single part, comprises here a slit 38 exposing up to the support made of composite material the totality of the leading edge 36 of the blade. In this manner, the metal reinforcement 34 which however still extends over the entire width of the test piece is separated into two distinct plates 34a and 34b facing each other on either side of the slit 38 beyond the leading edge 36. Depending on the mode of mounting selected, the plates 34a, 34b may or may not comprise at their free ends beyond the leading edge 36 respective holes (not shown) which can serve to ensure a grip, for example by inserting a bolt there (see the retaining screw 58 of FIG. 3).

The part thus cut and prepared becomes a test piece usable for peel testing, because it comprises a distinct reinforcement on each of its faces, materialized by each plate 34a, 34b of which the free end is disengaged from the support, materialized by the airfoil 32, and thus easily grippable.

Figure 3:
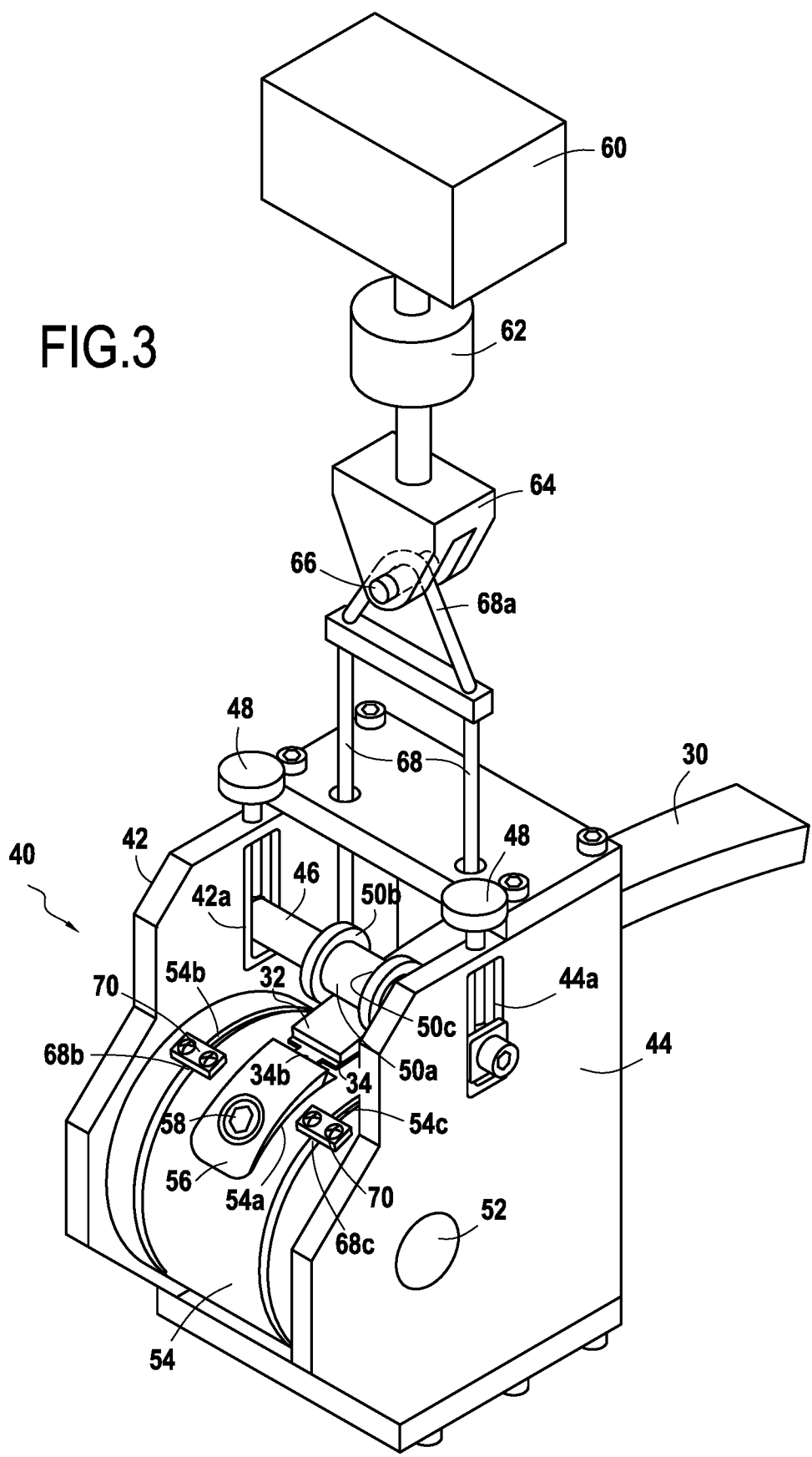
FIG. 3 is a perspective schematic drawing of a peel testing device according to the invention.

With reference to FIG. 3, an example of a peel testing device according to the invention is now described, implementing the test piece shown in FIG. 2, from which the reinforcement portion not subject to testing (for example that glued to the suction surface 32b) will have previously been removed. As explained further on, the peel testing device according to the invention can also be used with a wide range of test pieces, of complex or simple shapes, other than that shown here.

The device includes a fixed frame 40 formed of two vertical parallel walls 42, 44 each comprising a slot 42a, 44a of oblong shape with a horizontal minor axis and a vertical major axis. These parallel slots 42a, 44a serve as a passage for a first shaft 46 perpendicular to the walls 42, 44, of a diameter corresponding to the minor axis of these slots. The shaft 46 is adjustable in translation in the slots in the vertical direction of their major axis, for example by means of two adjusting wheels 48.

A guide roller 50 in the form of a spool is mounted on the shaft 46 substantially at its center. This roller, free in rotation around the shaft 46, includes a hollow core 50a for the passage of the shaft and two flanges 50b, 50c at its two ends forming supporting surfaces for the test piece 30.

The two walls 42, 44 are each also pierced with a supplementary opening to allow the passage of a second shaft 52 perpendicular to these two walls and designed to receive a face roller 54 free in rotation around the shaft 52.

It can be noted that, in the entire range of adjustment in translation of the guide roller 50, the face roller 54 is offset horizontally and vertically from the guide roller.

The face roller has a cylindrical surface and a radius at least equal to the radius of curvature of the reinforcement at the peeling face. For example, with a titanium reinforcement of 1.0 mm thickness and with an adhesive having a strength of 1000 J/m$^2$, a face roller can be used having a radius at least equal to 70 mm.

The face roller includes at its periphery, on the one hand, a compartment 54a for receiving a clamping wedge 56 and on the other hand two circular recesses 54b, 54c made on either side of this compartment. The clamping wedge designed to retain the free end of the plate 34a, 34b embedded in the compartment 54a constitutes, with its retaining screw 58, a mounting element of the reinforcement on the face roller.

For its implementation, the peel testing device also includes a traction machine 60 of the uniaxial type comprising a ram with a vertical axis on which is mounted a force sensor 62 designed to measure the vertical traction force exerted by the ram. It will be noted that the force sensor can equivalently be mounted at any other point of the traction chain. At the end of the ram is arranged a clevis 64 and axis 66 assembly designed to receive the loop 68a of a fastening cable 68 surrounding the face roller 54 and of which the two ends 68b, 68c of the two parallel strands of the same length are retained by a retaining pad 70 in each of the two recesses of the face roller, substantially at the compartment 54a. This fastening cable 68 thus forms with the face roller 54 a pulley system allowing the rotation of the face roller to be simply imposed by the displacement of the ram of the traction machine. It will be noted that it is necessary to have two strands in order for the cylinder to rotate homogeneously (a single offset strand would in fact cause imbalance in the rotation of the cylinder) and so that peeling occurs in the right direction. In addition, the test piece is positioned in the center of the cylinder. Likewise, to avoid imbalance in the rotation of the cylinder, the two recesses advantageously ensure retention in position of the parallel strands.

Figure 4:
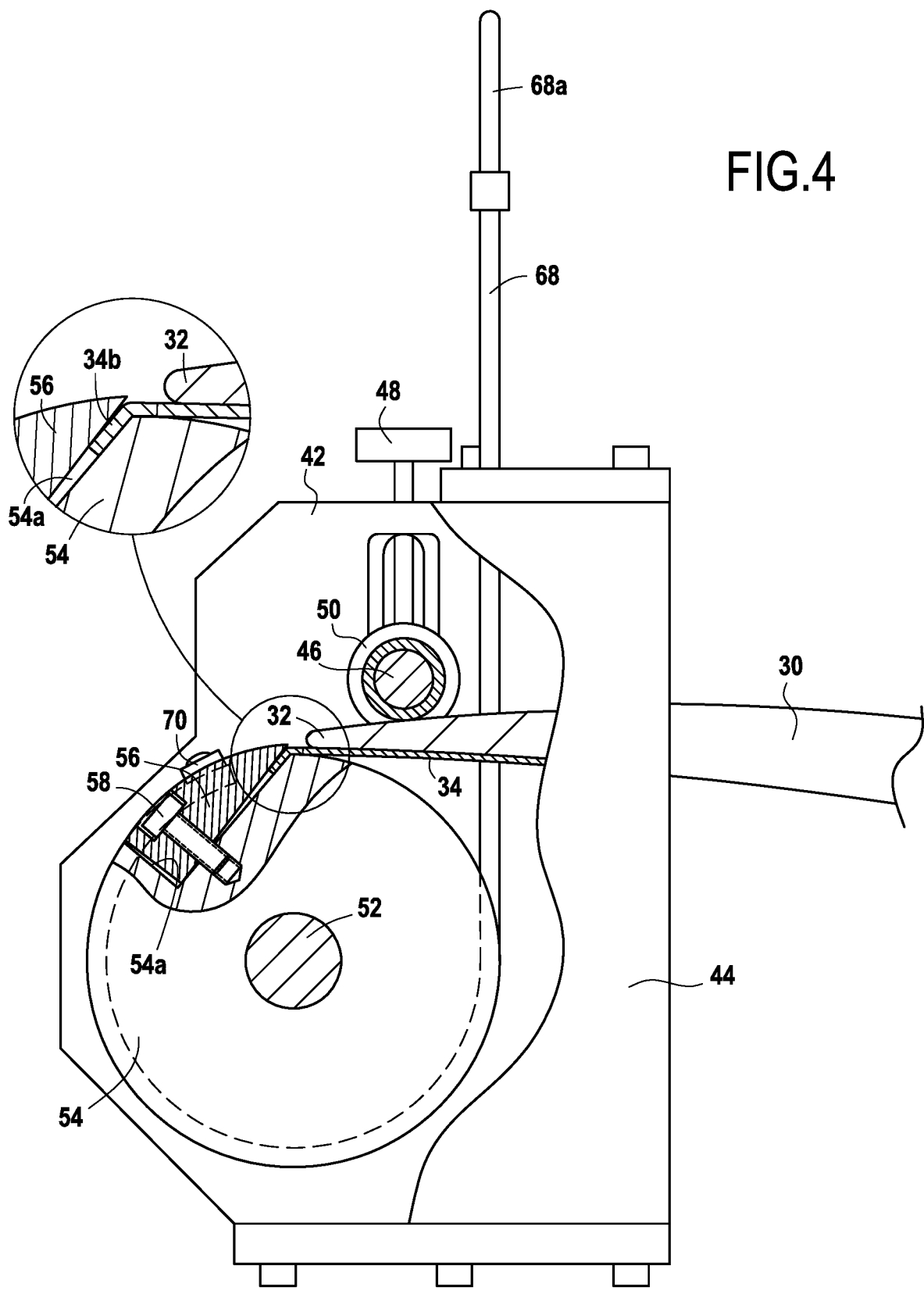
FIG. 4 is a section view of the peel testing device of FIG. 3.

In FIG. 4, the disposition of the test piece 30 between the guide roller 50 and the face roller 54 can be noted, the free end 34b of the metal reinforcement 34 being embedded in the compartment 54a of the face roller and held clamped by the clamping wedge 56 attached to the face roller by the screw 58. Due to its small diameter, the guide roller constrains the displacement of the blade and allows the necessary lever arm to be generated for the peeling of the metal reinforcement. The advantage of the recesses 54b, 54c made in the face roller and receiving the fastening cable 68, which is therefore always in tension, vertically and tangentially to this face roller, will also be noted.

During operation, the fastening cable 68 is put under tension by the ram of the traction machine 60 which, in its translation generates the rotation of the face roller 54. The free end 34b of the metal reinforcement 34 embedded in the face roller is then driven with this rotation into a strain which participates in peeling the metal reinforcement from the blade, then deforming it by coiling. Thus, by constraining the metal reinforcement to coil around a cylinder with a radius at least equal to the radius of curvature of the reinforcement at the peeling face, the force necessary for the deformation of the metal reinforcement of the blade remains less than or equal to half the measured force. For example, for a titanium reinforcement of 1.0 mm thickness, an adhesive having a strength of 1000 J/m$^2$ and a face roller having a radius of 70 mm, the force necessary for the deformation of the metal reinforcement of the blade will be 25 N for a measured force of 50 N. For the same example, but with a face roller of radius 140 mm, the force necessary for the deformation of the metal reinforcement of the blade will be 6 N for a measured force of 50 N. Finally, for a titanium reinforcement of 1.0 mm thickness, an adhesive having a strength of 2000 J/m$^2$ and a face roller having a radius of 140 mm, the force necessary for the deformation of the metal reinforcement of the blade will be 6 N for a measured force of 95 N. In fact, by increasing the diameter of the cylinder, the bending of the reinforcement is reduced and therefore the force necessary for the structural deformation of this metal reinforcement. Moreover, by this coiling configuration, a deformed state is imposed identical to the entirety of the peeled portion of the metal reinforcement. The variable thickness of the metal reinforcement then becomes the sole source of variation of the force necessary for the deformation of the metal reinforcement, thus improving the reproducibility and the repeatability of the test.

The invention claimed is:

1. A peel testing device designed to test the resistance to peeling of test pieces, each of said test pieces being formed from a support and a reinforcement glued to said support, and comprising:
    a frame with a face roller and at least one guide roller, with parallel axes designed to hold a test piece in abutment while still guiding it in displacement, tangentially to the rollers, by rolling, during the peel testing, at least one of said two rollers being movable and adjustable in translation in at least one slot;
    a traction machine configured to peel the reinforcement from the support in a peeling direction tangential to the face roller; and
    a sensor for measuring the force exerted by the traction machine during peeling;
    wherein the peel testing device also comprises a fastening cable connected, on the one hand, to the traction machine, and on the other hand to the face roller with which it forms a pulley system and wherein the face roller, which has a greater diameter than that of the guide roller, comprises a mounting element to retain the reinforcement fixedly there.

2. The peel testing device according to claim 1, wherein the fastening cable is folded in two to form a loop designed to be connected to the traction machine and two parallel strands of the same length, of which the two free ends are designed to be mounted on the face roller.

3. The peel testing device according to claim 2, wherein the face roller comprises at its periphery and on either side of the mounting element two circular recesses for receiving the two parallel strands of the fastening cable.

4. The peel testing device according to claim 1, wherein at least one of the face roller or the guide roller is movable in translation and adjustable with two adjusting wheels acting on a shaft carrying said roller.

5. The peel testing device according to claim 1, wherein the mounting element is a clamping wedge for retaining a free end of the reinforcement in a compartment of the face roller.

6. The peel testing device according to claim 1, wherein the guide roller has the shape of a spool with a hollow core and two flanges at its two ends designed to form two supporting surfaces for the test piece.

7. The peel testing device according to claim 1, wherein the radius of the face roller is determined so that the force necessary for the deformation of the reinforcement remains less than or equal to half the force measured by the sensor.

8. The peel testing device according to claim 1 for the test of test pieces originating in fan blades of which the support is a portion of a blade airfoil made of composite and the reinforcement is a metal blade reinforcement, made of titanium.

* * * * *